United States Patent  [15] 3,634,953
Shannon  [45] Jan. 18, 1972

[54] SUBSTANTIALLY NONCONSUMABLE, MACHINE-SCORABLE AND COMPUTER-PROCESSABLE EDUCATIONAL AND TESTING DEVICES PARTICULARLY ADAPTED FOR THE TESTING OF YOUNG CHILDREN

[72] Inventor: James L. Shannon, Stockton, Calif.
[73] Assignee: Edcodyne Corporation, Orange, Calif.
[22] Filed: Dec. 18, 1969
[21] Appl. No.: 886,301

[52] U.S. Cl. ...................................................................35/48 A
[51] Int. Cl. ................................................................G09b 1/18
[58] Field of Search ...........................35/48 A, 48, 32, 35.5

[56]  References Cited

UNITED STATES PATENTS

| | | | |
|---|---|---|---|
| 1,500,777 | 7/1924 | Stevenson | 35/48 A |
| 2,357,082 | 8/1944 | Carolin | 35/48 A |
| 3,266,049 | 8/1966 | Parmenter | 35/48 A |
| 3,351,950 | 11/1967 | Wolfe | 35/48 |

Primary Examiner—Robert W. Michell
Assistant Examiner—J. H. Wolff
Attorney—James J. Romano, Jr.

[57]  ABSTRACT

New and improved, substantially nonconsumable, machine-scorable and computer-processable educational and testing devices for the testing of young children are provided and include a test booklet and mark sense test-scoring card having a plurality of response columns for use therewith through the mounting of said card in said booklets. A multiple-choice test in the form of a plurality of test item pages is provided in said test booklet, and said test pages are respectively arranged, sized and configured to automatically register with a different one of said test-scoring card response columns, and to insure that only one test item is visible at any one time to thus minimize child distractability and facilitate the marking by the child of a desired response area in the relevant test-scoring card response column. Indicia in the nature of the color coding of the respective test item pages are provided to focus the attention of the child taking the test thereon, and to facilitate test administration. At the completion of the test, the test-scoring card is removed for appropriate machine scoring and computer processing of the test results, while the test booklet remains ready for repeated reuse through the simple mounting of a new test-scoring card therein. Means are also included to enable the ready and convenient change in the contents of some or all of the test items as desired.

18 Claims, 12 Drawing Figures

SUBSTANTIALLY NONCONSUMABLE, MACHINE-SCORABLE AND COMPUTER-PROCESSABLE EDUCATIONAL AND TESTING DEVICES PARTICULARLY ADAPTED FOR THE TESTING OF YOUNG CHILDREN

BACKGROUND OF THE INVENTION

1. Field of the Invention

This invention relates to new and improved, substantially nonconsumable, machine-scorable and computer-processable educational and testing devices for the testing of children in the 3½ to 7 year old range and, more particularly, for the testing of preschool age children in the 3½ to 5 year old range.

2. Description of the Prior Art

The education and testing of young children, and especially of those of preschool or early grade age, may be understood to be a field of very rapidly increasing scope as evidenced, for example, by the large number of federal and state programs currently being proposed or administered in this area. More specifically, on the federal level, such programs are based upon or include, for example, certain provisions of Title I of the Elementary Secondary Education Act, the federal program commonly known as "Head Start," and certain others of the federally regulated programs as administered by the Office of Economic Opportunity, many of which mandate very significant increase in the amount of hard test data which must be collected for child progress evaluation. On the state level, and taking for example our most populous state of California, it may be understood that such programs are called for in the California State Preschool Program which mandates substantial increase in the education and testing of preschool age children, and the Miller-Unruh Reading Act of 1965 which requires increased testing of first, second and third grade children.

Although a variety of testing devices are known for the testing of young children in the 3½ to 7 year old range, it may be understood that no such testing device is known which is substantially nonconsumable and which provides for test results in a form which is readily machine scorable and computer processable. More specifically, in a first instance it is believed well known that although there are a very wide variety of substantially nonconsumable test devices available, the results of which are readily machine scorable and computer processable, such test devices require general comprehension levels and motor coordination skills far beyond the scope of the average 3½ to 7 year old child to thus render the same substantially inapplicable for use with children in this age range. In addition, and although there are believed to be in existence certain testing devices, the results of which are machine scorable and computer processable, and which are applicable for utilization with children in this age range, it may be understood that the same will, in general, be found to be substantially consumable, whereby the cost per test becomes excessive in that the testing device is substantially consumed after one utilization thereof. Too, and of further disadvantage with regard to many of the machine-scorable and computer-processable testing devices of the prior art is the fact that the same require the use of specialized test-scoring cards or the like which are processable only on specialized data-processing machinery to thus require the user of the tests to purchase this specialized data-processing machinery, which is usually quite expensive, or to subscribe to a scoring service which is provided by the marketer of the test, and is always quite expensive.

Considering first the significance of substantial nonconsumability, it may be understood that this term as utilized herein is intended to mean that a substantial or major portion of the educational and testing device is suitable for repeated use in repeated application of the test, and need not be discarded after one such use to obviously significant economic advantage.

The advantages of the provision of the test results in a form which is readily machine scorable and computer processable are also extremely significant in the economic area, as well as in the area of enabling far more complete and effective utilization of the test results.

More specifically, in the area of economics it is believed clear that the provision of test results which are readily machine scorable and computer processable in consistently accurate manner will result in very significant savings in time on the part of the test administrator and/or test scorer to obviously significant economic advantage. In addition, it may be understood that the provision of test results which are readily computer processable, through the use of appropriately designed computer programs, provides for a variety of significant advantages amongst which are: the automatic provision by the computer of a profile for each child showing not only the child's total score, but also which specific subtest areas the child scored high and low on to thus enable the advantageous utilization of a diagnostic prescriptive teaching technique by providing for the prescription of a specific teaching technique to improve each individual child; the automatic provision by the computer of a frequency distribution including descriptive statistics for each subtest area to thus enable concentration by the teacher upon subtest areas in which the entire class has made relative low scores; and the automatic provision by the computer of an item analysis to establish a difficulty index for each item and to establish an internal validity index showing the contribution of each item to the validity of the test as a whole.

Another significant advantage of the administration of machine-processable tests to young children in the age group discussed hereinabove is the fact that such children are familiarized thereby at an early age with the use of this increasingly prevalent form of data recording which they are likely to encounter throughout their school career and adult life.

OBJECTS OF THE INVENTION

It is, accordingly, a primary object of this invention to provide new and improved, substantially nonconsumable, machine-scorable and computer-processable, educational and testing devices which are particularly adaptable for administration to young children in the 3½ to 7 year old age group.

Another object of this invention is the provision of new and improved educational and testing devices as above comprising a plurality of test item pages, and a test-scoring card or the like having a plurality of response columns, wherein provision is made for the automatic registration of each of said test item pages with a different one of said test-scoring card response columns to thus materially reduce the level of comprehension and motor coordination required on the part of a child to take the test.

Another object of this invention is the provision of new and improved educational and testing devices as above wherein said test-scoring card or the like is readily removable therefrom.

Another object of this invention is the provision of new and improved educational and testing devices as above comprising features which substantially minimize child distractability and function to focus the attention of the child on the specific test item in question, to thus maximize effective test administration.

Another object of this invention is the provision of new and improved educational and testing devices as above comprising features which significantly facilitate test administration.

Another object of this invention is the provision of new and improved educational and testing devices as above utilizing a test-scoring card or the like which is readily processable by general purpose data-processing machinery to thus eliminate the need for subscription to a scoring service for use of said devices, or the renting or purchase of specialized scoring machinery.

Another object of this invention is the provision of new and improved educational and testing devices as above comprising features which enable the ready and convenient replacement of the test items included therein by test items having other and different contents to thus provide for significant versatility.

A further object of this invention is the provision of new and improved educational and testing devices as above which are of simple, relatively low-cost construction, and require the use of only readily available, durable materials in the construction thereof to thus provide for a long useful life for said devices.

A still further object of this invention is the provision of new and improved educational and testing devices as above which are particularly adapted for administration to preschool age children in the 3 ½ to 5 year old range.

SUMMARY OF THE INVENTION

As disclosed herein in the form of a currently preferred embodiment thereof, the new and improved educational and testing devices of the invention comprises a test booklet and a generally conventional mark sense test-scoring card for use therewith. The test booklet includes first and second test scoring card mounting pages and first and second sets of test item pages disposed adjacent thereto, and each of said test-scoring card mounting pages and the individual pages of said test item sets are preferably color coded to provide for the ready and convenient visual identification thereof by the test administrator and the children taking the test. For use with a test-scoring card having a plurality of response columns and three answer or response areas as indicated, for example, by answer or response area indicating rectangles in each of said test scoring card response columns, it may be understood that each of said test item pages will comprise a multiple choice array of three objects, letters, numerals or the like printed or otherwise formed thereon, and that the respective test item pages are disposed, sized and configured relative to said test-scoring card so that the lower edge thereof will automatically register with a different one of said test scoring card response columns when said test item pages are moved by turning into operative position.

In use, the test booklet is opened to the first test-scoring card mounting page, and the test-scoring card mounted therein by the test administrator in such manner that the response columns on the front side thereof are exposed to view. The test item pages of the first test item set are then turned over in succession by the children in accordance with the simple, repetitive instructions of the test administrator, with the lower edge of each of said test item pages automatically registering with a different one of said test scoring card response columns to facilitate the marking by the child of the desired response area indicating rectangle in each of said test-scoring card response columns. The test item pages are arranged so that as each is turned over, the same will function to substantially cover from view the precedingly turned-over test item page to thus prevent distraction of the child by the test item contents of the latter. In addition, the respective test item pages are arranged so that the test items formed thereon are visible only upon turning of the relevant test item page to thus further prevent child distraction by insuring that only one test item is visible at any one time.

At the completion of the first test item set, it may be understood that the test-scoring card is removed by the test administrator from the first test-scoring card mounting page, the booklet opened to the second test-scoring card mounting page, the test-scoring card inserted therein so that the reverse side thereof is visible, and the test item pages of the second test item set turned over in succession in accordance with the simple, repetitive instructions of the test administrator.

In a first embodiment, the test booklet comprises readily openable binding means in the nature of those found in a looseleaf notebook to thus enable the ready and convenient replacement of some or all of the test item pages of the respective test item sets with other and different test item pages to thus provide for the ready and convenient change in the contents of the test. In another embodiment, the respective test item pages are mounted in transparent, test item page mounting envelopes to thus enable the same ready and convenient change in the contents of the test without requiring opening of the test booklet binding. At the completion of the test, the test-scoring card is simply removed from the test booklet by the test administrator for advantageous machine scoring and computer processing thereof, thus leaving the test booklet ready for repeated reusage upon the simple insertion of a new test-scoring card therein.

DESCRIPTION OF THE DRAWINGS

The above and other objects and significant advantages of my invention are believed made clear by the following detailed description thereof taken in conjunction with the accompanying drawings wherein.

REPRESENTATIVE ILLUSTRATION OF THE PRIOR ART

Figure 1:
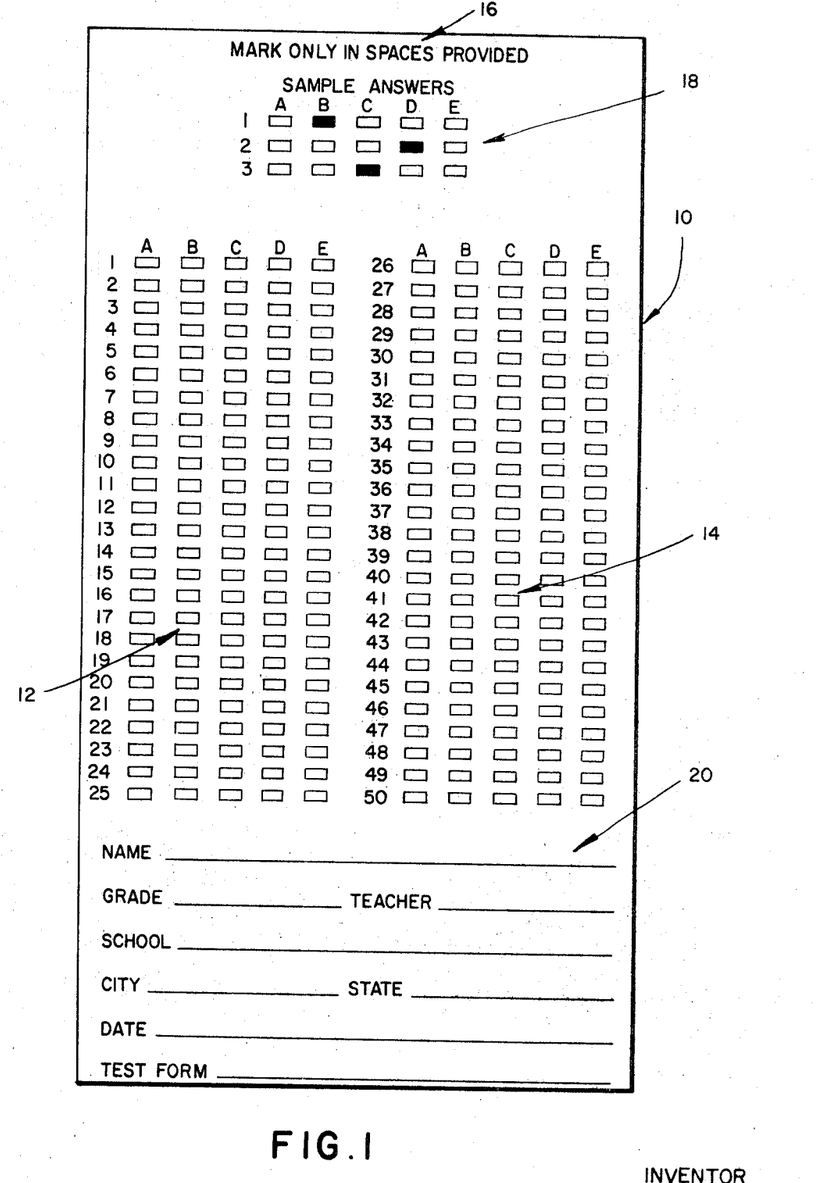
FIG. 1 depicts a representative, prior art machine-scorable and computer-processable test-scoring card for use independently of the test materials.

Referring now to FIG. 1, a machine-scorable and computer-processable, mark sense test-scoring card or sheet which may be understood to be representative of those arranged and utilizABLE in accordance with the principles of the prior art, is indicated generally at 10, and may be seen to comprise 50 mark sense response columns for response to 50 questions arranged as indicated generally at 12 and 14 in the depicted side-by-side column form. Further included on the test-scoring card 10 are instructions as to the use thereof as indicated generally at 16, a plurality of sample answers to illustrate such use as indicated generally at 18, and a space 20 for the provision of the indicated identifying information.

The test-scoring card or sheet 10 is for use in conjunction with, but physically independent of, a substantially nonconsumable multiple choice test, in manner well known to those skilled in this art, wherein the answer to each of a set of questions one through 50 is indicated by the taker of the test through the provision of a mark in the desired mark sense response area indicating oval of the plurality of the latter which are provided as shown in each of said response columns for each of said questions.

FIG. 1 is presented to clearly illustrate the unsuitability of the substantially nonconsumable, machine-scorable and computer-processable testing devices of the prior art to the testing of children in the 3½ to 7 year old age group. More specifically, it is believed quite obvious that the average child in this age group, and especially those children in the 3½ to 5 year old preschool age group, would be clearly lacking the motor coordination and general level of intellectual comprehension which would be required for satisfactory utilization of the test-scoring card 10. This is to say that such children most probably would not be able to clearly understand the directions for use of said test-scoring card and would not, in any event even be able to recognize the letters and numerals needed to associate the test items with the appropriate mark sense response positions which recognition, in itself, may be understood to frequently constitute part of the test content for children of this early age.

DETAILED DESCRIPTION OF THE INVENTION

Figure 2:
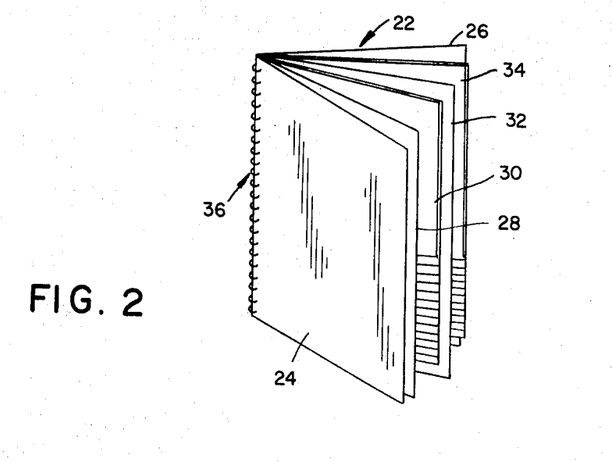
FIG. 2 is a perspective view of a new and improved educational and testing device which takes the form of a test booklet constructed in accordance with the teachings of my invention.

Referring now to FIG. 2, a currently preferred embodiment of the new and improved educational and testing device of my invention is indicated generally at 22 and may be seen to take the form of a test booklet having respectively a front cover 24, a back cover 26, a first test-scoring card mounting page 28, a first test set 30 of test item pages, a second test-scoring card mounting page 32, and a second test set 34 of test item pages relatively arranged as shown.

Test booklet binding means are indicated at 36 and, as currently preferred, may take the readily openable form thereof as found in a common looseleaf notebook to enable the ready and convenient replacement of some or all of the test item pages of the respective test sets 30 and 34 for purposes made clear hereinbelow. Alternatively, if such replacement is not desired, or if provision is made therefor through the use of other means as described in detail hereinbelow, it may be understood that the binding means 36 may, of course, take any suitably permanent form thereof. An important consideration in any event concerning the binding means 36 is that the same will enable the substantially flat disposition of all of the pages of the test booklet 22 whenever the same is open and laid upon a flat support surface in the nature of a desk top. Of additional importance with regard to the binding means 36 is the fact that the same should function to substantially prevent longitudinal and transverse sway of the respective test item pages upon the turning over of the latter for purposes described in detail hereinbelow.

Preferably, the respective test booklet front cover 24, back cover 26, and first and second test-scoring card mounting pages 28 and 32 are made from any readily available, relatively durable stock in the nature, for example, of high-quality cardboard, suitably plasticized paper, and/or a suitable plastic material in the nature of acetate, to enable the ready and convenient erasure of marks inadvertently made thereon by the children being tested and to, in any event, provide for long useful life or substantial nonconsumability of the test booklet as should be obvious. In like manner, it may be understood that the respective test item pages which constitute the test item sets 30 and 34 are also preferably made from a relatively durable material as discussed, although said test item pages will preferably be made from thinner stock of said material than said booklet covers and test-scoring card support pages for reasons made clear hereinbelow.

Figure 3:
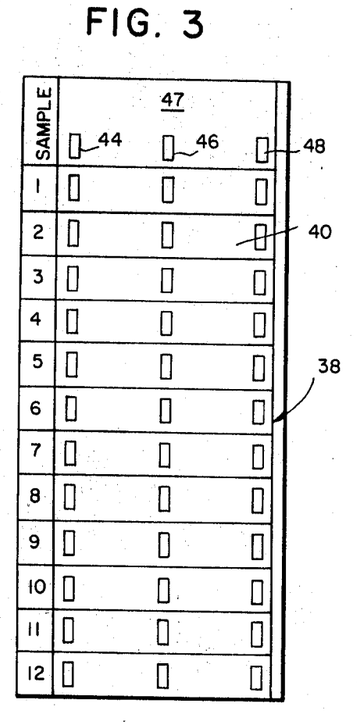
FIG. 3 is a plan view of the front side of a test-scoring card for use with the test booklet of FIG. 2 and arranged in accordance with the teachings of my invention.
Figure 4:
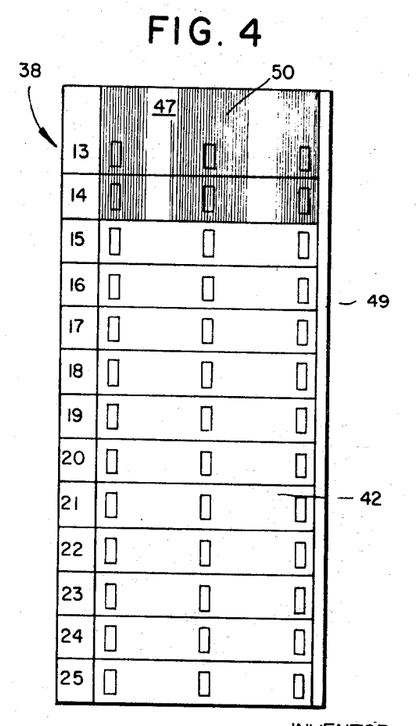
FIG. 4 is a plan view of the reverse side of the test-scoring card of FIG. 3.

The front side of a currently preferred form of a readily machine-scorable and computer-processable, mark sense test-scoring card 38 for use with the test booklet 22 is indicated at 40 in FIG. 3, while the reverse side of said test-scoring card is depicted at 42 in FIG. 4. The mark sense test-scoring card 38 is of conventional data-processing card construction and may, for example, be manufactured on special order to my specifications by the Supplies Division of the International Business Machines Corporation.

Referring first to the front side 40 of the mark sense test-scoring card 38, the same may be seen to include thereon a sample question column followed by response columns for questions 1 through 12 appropriately numbered as such, and a plurality of spaced, answer or response area indicators formed as shown in substantial alignment in each of said response columns. More specifically, and as seen for the sample response column in FIG. 1, these answer or response area indicators take the form of spaced, response area indicating rectangles as shown at 44, 46 and 48, respectively, and it may be understood that the said rectangles are preferably spaced within the response column under discussion to the maximum possible extent commensurate with appropriate sizing thereof and the form and content of the relevant test item page as explained in greater detail hereinbelow. Although the depicted rectangular configuration constitutes a currently preferred form of the answer or response area indicators, it may be understood that other and different answer or response area indicator configurations in the nature, for example, of circles, or circles with rectangles or squares formed therein, have also proven suitable in this regard.

The reverse side 42 of the mark sense test-scoring card 38 may be seen in FIG. 4 to be substantially identical to the front side 40 thereof with the obvious exceptions that the respective response columns are numbered differently, and that no sample response column appears thereon. Spaces as indicated generally at 47 and 49 are provided as shown on the respective front and reverse sides of the test-scoring card 38 to enable the identification of the child using the card in any desired manner, and any additional required data.

Consideration of FIGS. 3 and 4 is believed to make clear that the mark sense test-scoring card 38 is specifically designed for use in conjunction with a test having 25 multiple choice questions and wherein three possible answers or responses are provided for each of said questions. It is, of course, believed clear that a different number of response columns may be provided on the front and/or reverse side of the mark sense test-scoring card 38, and that a different number of answer or response area indicators may be provided in each of said response columns to enable the utilization of the card with multiple choice tests having a different number of questions and a different number of possible answers for each of said questions.

Preferably, each of the front side 40 and reverse side 42 of the mark sense test-scoring card 38 are surface treated in conventional mark sense manner as partially shown at 50 in FIG. 4 to assure that sufficient material will be removed from a mark sense pencil in the respective response areas, while skipping a substantial portion of the intermediate card surface areas to substantially inhibit detection by card-scoring machinery of response carryover between response areas as should be obvious.

Figure 5:
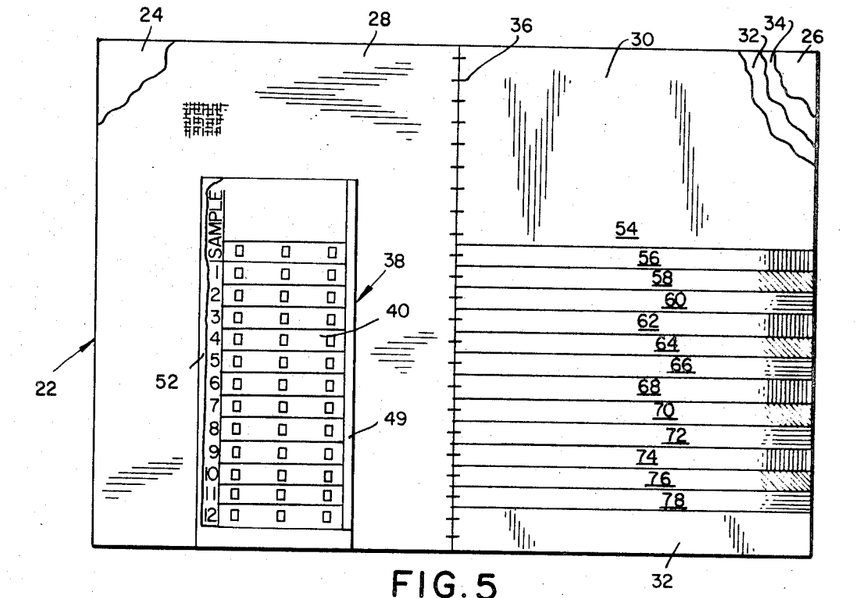
FIG. 5 is a plan view of the test booklet of FIG. 1 open to the first test-scoring card mounting page thereof.

Referring now to FIG. 5 which depicts the test booklet 22 open to the position thereof for administration of the first test section or test set 30, it may be seen that the mark sense test-scoring card 38 is mounted from the first test-scoring card mounting page 28 through the use of test scoring card mounting means as indicated at 52. The test scoring card mounting means 52—which are depicted in partially cutaway form in FIG. 5 to insure clarity of illustration of the test-scoring card 38—will preferably take the form of the depicted, generally L-shaped member which is formed from or affixed to the relevant surface of the first test-scoring card mounting page 28 as shown to in essence present a two-sided envelope into which the test-scoring card 38 may readily be inserted for substantially positive positioning relative to said mounting page as should be obvious. A particular advantage of this form of test-scoring card-mounting means is believed made clear, for example, by FIG. 6, wherein may readily be seen that the same function to substantially cover all writing on front side 40 of said test-scoring card to thus prevent distraction thereby of the child taking the test to obvious advantage. Alternatively, it is believed clear that other and different forms of test card mounting means in the nature, for example, of appropriately sized and positioned slits formed in the first test scoring card mounting page 28 and into which two or more of the corners of the test-scoring card 38 may be inserted in obvious manner, may be utilized.

Regardless of the form taken by the test-scoring card mounting means, it is believed clear that the substantially positive mounting of the test-scoring card 38 from said mounting page will function to substantially prevent mutilation of the former at the hands of the child taking the test. In addition, it may be understood that the provision and use of a test-scoring card mounting page 28 as described, rather than the direct mounting of the test-scoring card 38 from the reverse side or verso of the cover page 24 leaves the latter substantially free for the printing of information in the nature, for example, of copyright notice and/or of instructions to the test administrator thereon, while insuring that such information is completely hidden from view upon opening of the test booklet 22 to the position thereof depicted in FIG. 5 to thus make certain that distraction of the child taking the test by this printed information is also prevented.

For use with the test-scoring card 38, the test item set 30 may be understood to comprise 13 test item pages as indicated at 54 through 78, respectively, each of which is, of course, freely and independently turnable in the manner of a page of a book.

Preferably, the respective test item pages 54 through 78 and the test-scoring card mounting page 28 comprise indicia which are readily discernible visually by both the test administrator and the children taking the test, and readily understandable by the latter, to further reduce child distractability, focus child attention, and significantly facilitate test administration, all as discussed in greater detail hereinbelow. More specifically, it may be understood that such indicia may, for example, take the form of the simple color coding of said test item pages and said test scoring card mounting page. Thus, and for purposes of example, only, in indicating one color-coding scheme which has proven suitable in this regard, it may be understood that the test-scoring card mounting page 28 may be colored yellow, the respective test item pages 54, 60, 66, 72, and 78 colored blue, the respective test item pages 56, 62, 68, and 74 colored pink, and the respective test item pages 58, 64, 70, and 76 colored green, all as indicated by the appropriate color symbol hatchings as appear on portions, only, of the said test item and test-scoring card mounting pages in FIG. 5.

Figure 6:
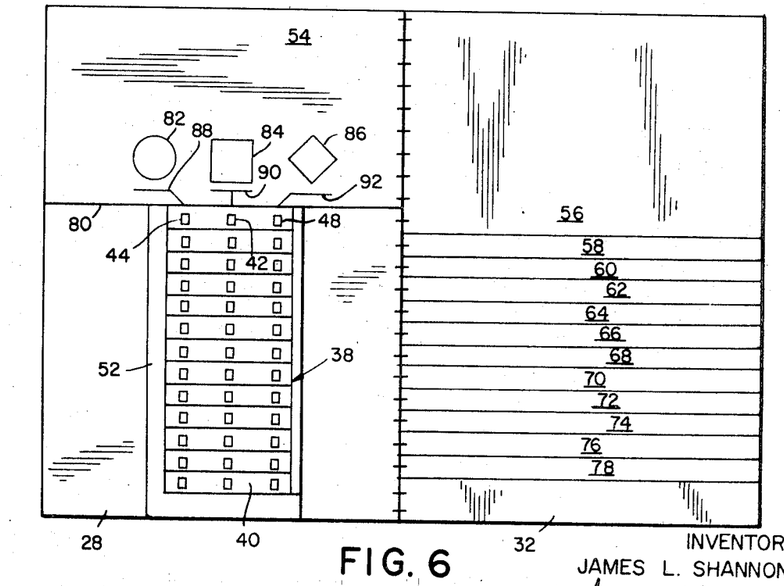
FIG. 6 is a plan view of the test booklet of FIG. 5 with the first test item page of the first test item set turned over into operative position.

It is of particular significance with regard to the new and improved test booklet of my invention that each of the test item pages of the test item set 30 is supported by binding means 36, and sized and configured relative to the test-scoring card 38 when the latter is operatively mounted as described on test-scoring card mounting page 28, so that the lower edges of said test item pages will overlay and automatically register with the upper portion of a predetermined response column on said test-scoring card upon the turning over of said test item pages. More specifically, and as seen in FIG. 6 wherein test item page 54 has been turned over, the lower edge of said test item page as indicated at 80 overlaps and automatically registers with the portion of the sample response column disposed just above the respective response area indicating rectangles formed therein, to thus provide for the automatic registration of said test item page with said response area indicating rectangles while nonetheless insuring total visability of the latter. The provision of this most advantageous feature of automatic test item page test-scoring card response column registration is made further clear by FIG. 7 which illustrates the same for the lower edge of test item page 56 relative to the number 1 response column on the test-scoring card 38, by FIG. 8 which illustrates the automatic registration of the lower edge of test item page 58 with the number 2 response column on said test-scoring card, by FIG. 9 which illustrates the automatic registration of the lower edge of test item page 60 with the number 3 test-scoring card response column, and by FIG. 10 which illustrates the automatic registration of the lower edge of test item page 78 with the number 12 test-scoring card response column, respectively.

Each of the test item pages may be understood to comprise a multiple choice test item printed or otherwise formed on the reverse side or verso thereof so as to be visible only upon the turning of the said test item page as should be obvious. More specifically, the test item page 54 may be seen in FIG. 6 to comprise a test item which includes test materials taking the form of a circle 82, a square 84, and a diamond 86, respectively spaced as shown and printed or otherwise formed on the reverse side or verso thereof, and said circle, square and diamond may be readily understood to constitute the subject matter of one multiple choice test item. Preferably, guide means which may, for example, take the form of guide lines as indicated respectively at 88, 90 and 92 for the circle 82, the square 84, and the diamond 86, are printed or otherwise formed as shown on the test item page 54 to in essence provide a visual guide link between the circle 82 and response area indicating rectangle 44, the square 84 and the response area indicating rectangle 46, and the diamond 86 and the response area indicating rectangle 48, respectively.

For use with the test-scoring card 38 having three response areas in each response column, it may be understood that each of the remaining test item pages 56 through 78 will include a three-item test in the nature of that depicted on test item page 54 in FIG. 6 formed on the reverse side or verso thereof, and that each of said test item pages will be sized, configured and arranged as discussed hereinabove so that the lower edge thereof will be in substantial alignment with a different one of the response columns on the test-scoring card 38 upon the turning over of the said test item page.

Figure 7:
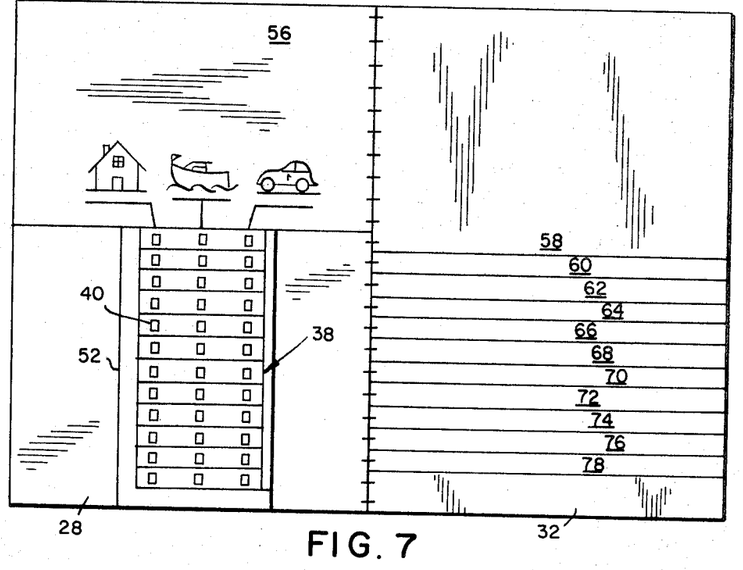
FIG. 7 is a plan view of the test booklet of FIG. 5 with the second test item page of the first test item set turned over into operative position.

Of additionally significant advantage with regard to the respective sizing, configuration and arrangement of the test item pages 54 through 78 is believed the fact that the turning over of any one of the same will be effective to completely cover and hide from view the test item which appears on the precedingly turned-over test item page to thus completely prevent distraction of the child by the test item which appears on the latter. More specifically, and as made clear, for example, by a comparison of FIGS. 6 and 7, it may be seen that the turning over of test item page 56 as illustrated in FIG. 7 will completely cover and hide from view the test item comprising the circle 82, the square 84 and the diamond 86 which appears on the precedingly turned-over test item page 54 to thus prevent distraction of the child by the latter while consideration is being given to the test item which appears on test item page 56. Too, the fact that the test items are, in each instance, printed or otherwise formed on the reverse side or verso of the test item pages prevents the viewing thereof, with attendant probability of child distraction, until the turning over of the same. As a result of all of the above, it is believed clear that only one test item will be visible at a time.

For typical use, for example, in the administration of a test comprising item sets 30 and 34 which include 25 multiple choice questions having three possible answers to each of said questions, to a group of 15 4-year-old children to provide for the application of diagnostic prescriptive teaching techniques thereto on the basis of a thorough computerized analysis of the test results as discussed hereinabove, it may be understood that a test booklet 22, containing an appropriately identified test-scoring card 38 mounted therein on test-mounting page 28 and open to this page as depicted in FIG. 5, would be placed upon the desk of each child. In addition, each child would, of course, be supplied with an appropriate mark sense pencil. The test would be commenced by the test administrator instructing the children to turn over the blue page which page would of course, be the sample test item page 54 so that each of the test booklets would be arranged as depicted in FIG. 6, it being understood that the fact that each of the children has followed these instructions correctly may be readily confirmed visually by the test administrator through the medium of a glance around the room to insure that each of the children has turned over the blue sample test item page 54. Too, the description of this test item page by the test administrator as the "blue" page will tend to focus the attention of the children thereon and will reduce the distractability thereof by the other test item pages.

When this has been ascertained, the children would be instructed to "look at the pictures," to "put your finger on the circle," and to "color the box under the circle." Following this, the test administrator would preferably briefly tour the room to check each child's test booklet to insure that the directions were understood and followed correctly by the marking of the response area indicating rectangle 44 and, since this first test item is a sample test item, would most probably correct any wrong answers by pointing out the circle to the relevant child and demonstrating the marking of the correct box or response area indicating rectangle 44. Alternatively, the administration of the sample test item may be accomplished through the use of a large replica thereof as drawn, for example, on a blackboard, or by means of a sample test item image as projected on a screen using an acetate transparency projector.

After this has been done and the test administrator satisfied that each of the children understands the operation of the test, the instructions would be given to "turn over the pink page" which "pink" page would, of course, be the following test item page 56. At this point each of the test booklets should be arranged in the manner depicted in FIG. 7 and this arrangement may again be readily and conveniently verified visually by the test administrator as discussed hereinabove. Following this, assuming the car to be the article to be recognized, the instructions would be, "look at the picture," "put your finger on the car, color the box under the car" and, after the expiration of the desired time interval, "turn over the green page."

In response to this latter instruction, it may be understood that each of the children would turn over the test item page 58 so that each of the test booklets would now be arranged as depicted in FIG. 8, it again being understood that verification of this desired test booklet arrangement can be readily and conveniently effected by the test administrator as discussed hereinabove.

Figure 8:
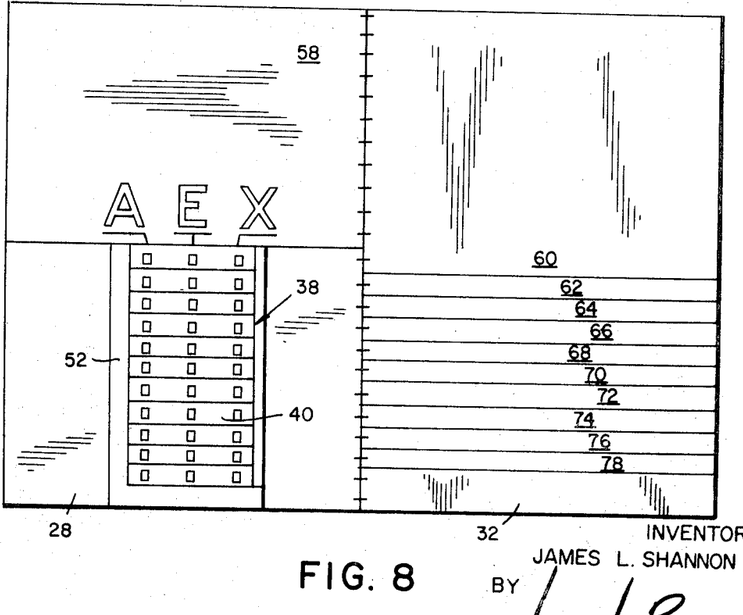
FIG. 8 is a plan view of the test booklet of FIG. 5 with the third test item page of the first test item set turned over into operative position.

Upon verification of test booklet arrangement as depicted in FIG. 8, and assuming the E to be the letter to be recognized, the instructions would be, "look at the pictures, put your finger on the 'E,' color the box under the 'E' and, after the expiration of the desired time interval, "turn over the blue page," which blue page would, of course, be the following test item page 60.

Figure 9:
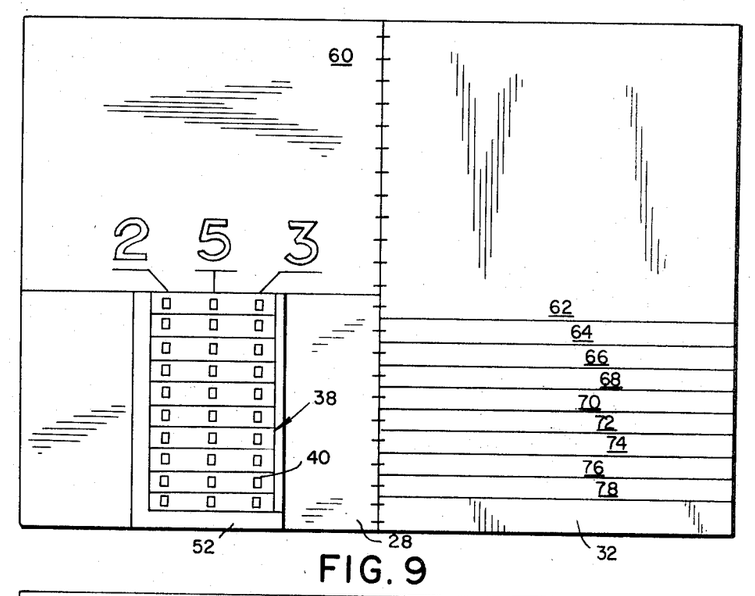
FIG. 9 is a plan view of the test booklet of FIG. 5 with the fourth test item page of the first test item set turned over into operative position.
Figure 10:
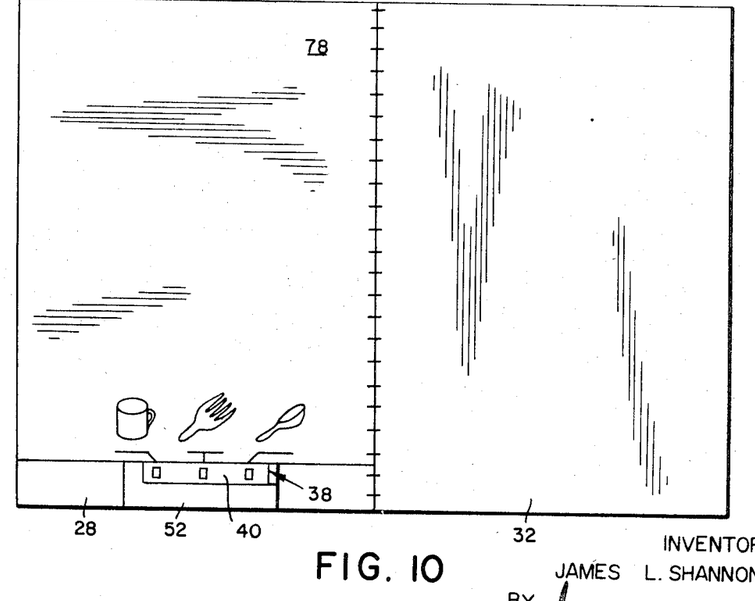
FIG. 10 is a plan view of the test booklet of FIG. 5 with the final test item page of the first test item set turned over into operative position.

At this point, it is believed clear that each of the test booklets should be arranged as depicted in FIG. 9, and that verification of this test booklet arrangement can again be readily and conveniently effected visually by the test administrator as discussed hereinabove. Following this verification, and assuming the 3 to be the numeral to be recognized, the instructions would be "look at the pictures, put your finger on the '3,' color the box under the '3'" and, after the expiration of the desired time interval, "turn over the blue page."

This procedure would be repeated as described until last test item page 78 of the test item set 30 has been turned over to arrange all of the test booklets as depicted in FIG. 9, at which time, and assuming the fork to be the article to be recognized, the instructions would be, "look at the pictures, put your finger on the 'fork,' color the box under the fork," to thus complete the administration of the first test item set 30.

Figure 11:
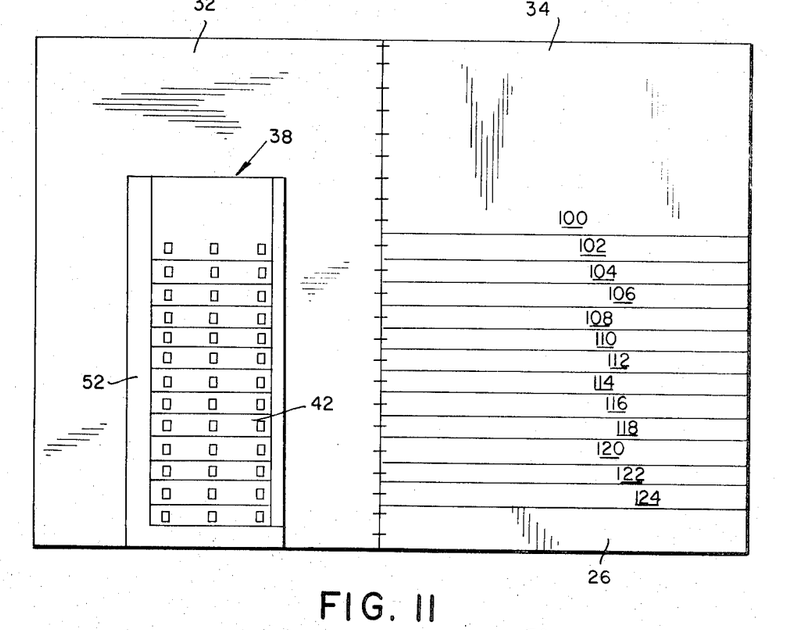
FIG. 11 is a plan view of the test booklet of FIG. 2 open to the second test-scoring card mounting page thereof.

At this point the test administration would preferably tour the room taking each child's test booklet in turn to remove the test-scoring card 38 from the test-scoring card mounting page 28, turn over the test-scoring card mounting page 32, and insert said test-scoring card in the latter so that the reverse side 42 thereof is visible to thus arrange each of the test booklets and test-scoring cards in the manner shown in FIG. 11. Following this, administration of the second test item set 34 would be commenced by the instructions to turn over the blue page, which would, of course, be the first test item page 100 of said second test item set.

Administration of the second test item set 34 would then be effected exactly as described hereinabove with regard to the first test item set 30 until the final test item page 102 had been turned over and the desired response area indicating rectangle in response column 25 on the test-scoring card 38 had been marked to thus complete the administration of the test. Although not specifically depicted, it may be understood that each of the test item pages 100 through 124 of the second test item set 34, and the second test-scoring card mounting page 32, are color coded in the manner described hereinabove with reference to the respective test item pages 54 through 78 of the first test item set 30 and the first test-scoring card mounting page 28.

At the completion of test administration, it is believed clear that the respective test booklets 22 may be readily collected and the respective test-scoring cards 38 readily removed therefrom for machine scoring and computer processing in accordance with an appropriate computer program to provide all of the significant advantages attendant such machine scoring and computer processing as described in detail hereinabove. The respective test booklets 22 may, of course, be repeatedly reused, with the extent of such reuse being limited only by the durability of test booklet construction and the frequency of test booklet utilization. Thus, for a test booklet of average construction, a useful life of 1 year or more on the basis of five uses per school week would not appear unreasonable to expect.

By this description of test administration is believed made clear that not even the recognition of symbols on the part of the child to associate the respective test items with the relevant response columns is required. In addition, it is believed made clear that the design of the test booklet 22 advantageously results in the child being taught to turn pages in normal manner from right to left and to then progress in normal manner from top to bottom on said pages, and it may be understood that these are most important skills which are not inherent, but rather, must be learned at early grade levels. Too, the fact that the test-scoring card 38 as specifically disclosed automatically provides for a pause or rest break between administration of the first subtest or test item set 30 and the second subtest or test item set 34, may be understood to be particularly compatible, to significant advantage, with the somewhat limited attention spans of young children which would dictate the provision of such pause or rest break.

By way of specific illustration of the substantial nonconsumability of the new and improved educational and testing devices of my invention, it may be understood that the cost of a test booklet of average construction may approach a dollar while the cost of a test-scoring card of average construction may be less than 1 cent. As a result, it is believed clear that said educational and testing devices are less than 1 percent consumable per utilization.

A particular advantage of the use of a test-scoring card 38 of generally conventional data-processing card construction is the fact that the same requires no special data-processing machinery for the processing thereof, but rather, can readily be processed by existing, every-day-type general purpose data-processing machinery as is already available in most school districts here in the United States, and in many school districts or the like abroad. Accordingly is believed made clear that the new and improved educational and testing devices of my invention may readily be employed independently of expensive test scoring and test result processing services to further significant economic advantage.

Since the simple instructions to the children required for effective test administration are completely verbal—there being no written instructions whatsoever to the children—and can just as readily be delivered in a language other than English, it is believed clear that the test booklet 22 and test-scoring card 38 would be perfectly applicable for use substantially without modification in all of the significant countries of the world. For such use, it may be understood, however, that some change may be desired in the content of the respective test items.

It is believed clear that the illustrated and described number of test item pages which are included in each of the first test item set 30 and the second test item page set 34, and the illustrated and described contents of the test items which appear on said pages, are provided herein by way of example, only, and that other and different numbers of test item pages per test item page set having other and different test item contents may, of course, be utilized.

Figure 12:
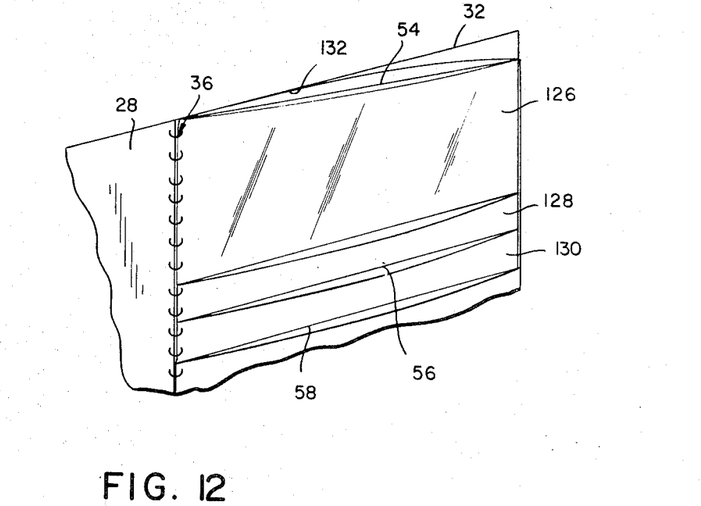
FIG. 12 is a perspective view depicting the construction of another embodiment of the test booklet of FIG. 2 wherein test item page mounting envelopes are provided for the operative mounting of each of the test item pages.

An embodiment which will permit the ready replacement of some or all of the test item pages which constitute the first and second test item page sets 30 and 34 is illustrated in FIG. 12, and may be seen therein to comprise the provision of test item page mounting envelopes as indicated at 126, 128, and 130 for the test item pages 54, 56 and 58 of the first test item page set 30. Each of the test item page mounting envelopes will preferably be formed from any transparent, relatively durable material in he nature, for example, of a suitable acetate composition, and will include an appropriately sized opening as indicated at 132 for test item page mounting envelope 126 formed therein to enable the ready and convenient insertion of a desired test item page therein, and the ready and convenient replacement of said test item page with another and different test item page as desired. As a result, it is believed made clear that change in the content of the respective test item sets may be readily and conveniently effected to thereby significantly increase the versatility of the test booklet without requiring the use of readily openable looseleaf-type binding means as discussed hereinabove. In addition, the use of the test item page mounting envelopes as indicated at 126, 128, and 130 may also be understood to provide for significant increase in the useful life of the test booklet in that the same will, of course, substantially protect the respective test item pages from marking and/or mutilation as should be obvious.

Although disclosed hereinabove by way of example as comprising two test item sets and two test-scoring card mounting pages for use with a test-scoring card 38 having response columns formed on both sides thereof, it is believed clear that the new and improved test booklet of my invention may alternatively be constructed to comprise only a single test item set and test-scoring card mounting page for utilization with a test-scoring card having response columns formed on only one side thereof. As another alternative, it is believed clear that said test booklet may be constructed to comprise four or more test item page sets and test-scoring cards mounting pages for use with two or more test-scoring cards, each having response columns formed on both sides thereof.

Further, and although disclosed hereinabove as taking the form of the mark sense test-scoring card 38, it may be understood that the test-scoring means may alternatively take the form of an appropriately arranged and configured test-scoring sheet, and that the width of the latter, or for that matter of the test-scoring card 38, may be made greater than that disclosed to provide for increased spacing between the respective provided answer or response area indicators to thus even further inhibit response carryover as should be obvious. Too, although disclosed as comprising answer or response area indicators which take the form of rectangles or the like for marking by a mark sense pencil to indicate the choice of answers, it may be understood that the test-scoring card or sheet may alternatively comprise answer or response area indicators which take the form of rectangles or the like which are preperforated in the form of a porta-punch-type card to enable the indication of the choice thereof by the simple punching out of the desired response area indicator rather than the marking thereof as described by a mark sense pencil. Finally, and although disclosed as being particularly adaptable for utilization in the education and testing of young children as discussed, it is believed clear that the new and improved educational and testing devices of the invention would be equally adaptable for utilization in the education and testing of the mentally retarded or the like despite the particular age or ages in years thereof.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In an education and testing device which includes a plurality of test item pages each having a test item appearing thereon, the improvements comprising a support member, sheetlike test-scoring means supported upon said support member and having a plurality of spaced response positions, there being a different one of said response positions for each of said test item pages, said test item pages being supported upon said support means and being movable in succession into operative association with said test-scoring means so that each of said test item pages is automatically operably registered with a different one of said response positions upon such movement, each of said test item pages comprising a multiple choice test item having spaced test materials appearing thereon, and each of said test scoring means response positions comprising respective spaced response area indicators appearing thereon, there being a different response area indicator for each of said test item materials, and wherein said test item pages and said test-scoring means are relatively arranged and configured so that said spaced test materials will respectively be in general alignment with different ones of said spaced response area indicators when a said test item page is operably registered with a said test scoring means response position to thereby facilitate the mental association of said test item materials with said response area indicators and minimize the comprehension and skill levels required for use of said educational and testing device, said test item pages extending progressively further in one direction so that as each test item page is successively moved it will substantially cover the test item on the previously moved test item page to prevent distraction by the latter.

2. In an educational and testing device as in claim 1 wherein, said test-scoring means are independent of and separable from said test item pages to thereby enable repeated reuse of the latter through replacement of said test-scoring means to thus provide for substantial nonconsumability of said educational and testing device.

3. In an educational and testing device as in claim 1 wherein, said test item pages and said test-scoring means are relatively arranged and configured so that the test item appearing on a said test item page will be visible only when the latter is operably registered with a said response position to thereby prevent distraction by the test item from any other test item page.

4. In an educational and testing device as in claim 3 wherein, said test-scoring means are independent of and separable from said test item pages to thereby enable repeated reuse of the latter through replacement of said test-scoring means to thus provide for substantial nonconsumability of said educational and testing device.

5. In an educational and testing device as in claim 3 wherein, said test item pages and said test-scoring means are relatively arranged and configured so that a test scoring means response position with which a test item page has previously been operably registered will not be visible upon the operable registration of a succeeding test item page with a different test scoring means response position to thus prevent distraction by the first-mentioned test scoring means response position.

6. In an educational and testing device as in claim 5 wherein, said test-scoring means comprise a test-scoring card, and said response positions are constituted by response columns which appear in succession from top to bottom on said card.

7. In an educational and testing device as in claim 6 wherein, said means supporting said test item pages and said test-scoring card comprise a test booklet which includes a test scoring card mounting page, said test item pages are arranged as a set in conventional successive manner in said test booklet opposite said mounting page with said test items appearing on the reverse sides thereof, and said test item pages are of different and successively increasing lengths which are respectively commensurate with the disposition of different ones of said successively arranged test-scoring card response columns on said test-scoring card whereby said test item pages may be administered by the turning over thereof in succession to respectively automatically operably register with a different one of said test-scoring card response columns and render visible only the test item which appears thereon.

8. In an educational and testing device as in claim 7 wherein, said test-scoring card mounting page comprises test-scoring card mounting means which provide for the separable mounting of said test-scoring card thereon, whereby the repeated reuse of said test booklet is enabled through replacement of said test-scoring card to thus provide for the substantial nonconsumability of said educational and testing device.

9. In an educational and testing device as in claim 8 wherein, said test booklet comprises means enabling the replacement of some or all of said test item pages with other and different test item pages to provide for significant test booklet versatility.

10. In an educational and testing device as in claim 8 wherein, said test-scoring card further comprises response positions which are constituted by response columns which appear in succession from top to bottom on the reverse side thereof, said test booklet further comprises another test-scoring card mounting page which follows said test item page set therein, and said device further comprises other test item pages which are configured and arranged as a set in said test booklet in the manner described for said test item page set relative to said another test-scoring card mounting page whereby said test item page set and said other test item page set may be administered in succession in that order by the removal of said test-scoring card from said test-scoring card mounting page following the administration of said test item page set, the opening of said test booklet to said another test scoring card mounting page, the disposition of said test-scoring card therein to render visible the response columns formed on the reverse side thereof, and the turning over in succession of said test item pages of said other test item page set, respectively.

11. In an educational and testing device as in claim 7 wherein, said test booklet comprises means enabling the replacement of some or all of said test item pages with other and different test item pages to provide for significant test booklet versatility.

12. In an educational and testing device as in claim 6 wherein, said test-scoring card is of a type which is readily machine scorable and computer processable.

13. In an educational and testing device as in claim 1, wherein said test item pages and said test-scoring means are arranged so that a test scoring means response position with which a test item page has previously been operably registered will not be visible upon the operable registration of a succeeding test item page with a different test scoring means response position to thus prevent distraction by the first-mentioned test-scoring means response position.

14. In an educational and testing device as in claim 1, wherein each of said test item pages include guide means appearing thereon to generally connect each of said spaced test materials with a different one of said response area indicators to further facilitate the mental association of said spaced test item materials with said spaced response area indicators.

15. In an educational and testing device as in claim 1 wherein, each of said test item pages comprise indicia appearing thereon for distinguishing the same, each from the other, whereby administration of said educational and testing device is facilitated by enabling the more precise identification of said test item pages.

16. In an educational and testing device as in claim 15 wherein, each of said test item pages include guide means appearing thereon to generally connect each of said spaced test materials with a different one of said response area indicators to further facilitate the mental association of said spaced test item materials with said spaced response area indicators.

16. In an educational and testing device as in claim 16 wherein, said test-scoring means are independent of and separable from said test item pages to thereby enable repeated reuse of the latter through replacement of said test-scoring means to thus provide for substantial nonconsumability of said educational and testing device.

18. In an educational and testing device as in claim 15 wherein, said indicia are constituted by the color coding of said test item pages.

* * * * *